(12) United States Patent
Axmon et al.

(10) Patent No.: US 11,026,141 B2
(45) Date of Patent: Jun. 1, 2021

(54) MOBILITY IN DENSE NETWORKS

(71) Applicant: Telefonaktiebolaget L M Ericsson (publ), Stockholm (SE)

(72) Inventors: Joakim Axmon, Kavlinge (SE); Muhammad Kazmi, Bromma (SE); Walter Muller, Upplands Vasby (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 691 days.

(21) Appl. No.: 14/780,530

(22) PCT Filed: Oct. 7, 2014

(86) PCT No.: PCT/EP2014/071423
§ 371 (c)(1),
(2) Date: Sep. 26, 2015

(87) PCT Pub. No.: WO2016/055095
PCT Pub. Date: Apr. 14, 2016

(65) Prior Publication Data
US 2016/0262065 A1 Sep. 8, 2016

(51) Int. Cl.
*H04W 36/08* (2009.01)
*H04W 4/029* (2018.01)
*H04W 36/32* (2009.01)
*H04W 36/00* (2009.01)
*H04W 84/04* (2009.01)

(52) U.S. Cl.
CPC .......... *H04W 36/08* (2013.01); *H04W 4/029* (2018.02); *H04W 36/0083* (2013.01); *H04W 36/00837* (2018.08); *H04W 36/32* (2013.01); *H04W 36/0069* (2018.08); *H04W 84/045* (2013.01)

(58) Field of Classification Search
CPC ...... H04L 5/0098; H04L 5/001; H04L 5/0096
See application file for complete search history.

(56) References Cited

U.S. PATENT DOCUMENTS

| | | |
|---|---|---|
| 2009/0088156 A1 | 4/2009 | Aaron |
| 2014/0106697 A1 | 4/2014 | Wang et al. |
| 2014/0146697 A1* | 5/2014 | Kim ..................... H04B 7/0413 370/252 |

(Continued)

FOREIGN PATENT DOCUMENTS

| | | |
|---|---|---|
| EP | 2696624 A1 | 2/2014 |
| WO | 2014146272 A1 | 9/2014 |

OTHER PUBLICATIONS

PCT International Search Report, dated Jun. 5, 2015, in connection with International Application No. PCT/EP2014/071423, all pages.

(Continued)

*Primary Examiner* — Gregory B Sefcheck
*Assistant Examiner* — Debebe A Asefa
(74) *Attorney, Agent, or Firm* — Leffler Intellectual Property Law, PLLC

(57) ABSTRACT

A network node may predict, from user equipment, UE mobility attributes and/or state, likely target SCells and pre-configure the UE with information about those SCells, allowing quick deactivation and activation when the UE reports one of the predicted target SCells as being better than then the existing current SCell.

17 Claims, 8 Drawing Sheets

(56) References Cited

U.S. PATENT DOCUMENTS

2016/0029265 A1* 1/2016 Li .................... H04W 36/0061
455/436

OTHER PUBLICATIONS

PCT Written Opinion, dated Jun. 5, 2015, in connection with International Application No. PCT/EP2014/071423, all pages.
3GPP TS 36.331 version 12.3.0 Release 12, LTE; Evolved Universal Terrestrial Radio Access (E-UTRA); Radio Resource Control (RRC); Protocol specification, Sep. 2014, 383 pages.
3GPP TSG-RAN WG2 Meeting #83, R2-132339, Barcelona, Spain, Aug. 19-23, 2013, NSN, Nokia Corporation, Autonomous SCell Management for Dual Connectivity Cases, 4 pages.
3GPP TSG-RAN WG2 #85, R2-140936, Prague, Czech Republic, Feb. 10-14, 2014, NTT Docomo, Inc., NSN, Introduction of Dual Connectivity, 45 pages.
3GPP TS 36.133 V12.3.0 (Mar. 2014), 3rd Generation Partnership Project; Technical Specification Group Radio Access Network; Evolved Universal Terrestrial Radio Access (E-UTRA); Requirements for support of radio resource management (Release 12), Table of Contents, 25 pages.
3GPP TS 36.133 V12.3.0 (Mar. 2014), 3rd Generation Partnership Project; Technical Specification Group Radio Access Network; Evolved Universal Terrestrial Radio Access (E-UTRA); Requirements for support of radio resource management (Release 12), Section 7.7, 2 pages.
3GPP TS 36.331 V12.1.0 (Mar. 2014), 3rd Generation Partnership Project; Technical Specification Group Radio Access Network; Evolved Universal Terrestrial Radio Access (E-UTRA); Radio Resource Control (RRC); Protocol specification (Release 12), Table of Contents, 13 pages.
3GPP TS 36.331 V12.1.0 (Mar. 2014), 3rd Generation Partnership Project; Technical Specification Group Radio Access Network; Evolved Universal Terrestrial Radio Access (E-UTRA); Radio Resource Control (RRC); Protocol specification (Release 12), Section 6.2.2, 45 pages.
Brazil Office Action dated Jun. 30, 2020 in connection with Brazil Application No. BR112017006813-3, 4 pages.
English language translation of Brazil Office Action dated Jun. 30, 2020 in connection with Brazil Application No. BR112017006813-3, 2 pages.

* cited by examiner

MOBILITY IN DENSE NETWORKS

TECHNICAL FIELD

Embodiments herein relate to a wireless communication system, and more specifically to controlling connections between a user equipment and secondary cells in a wireless communication system that provides carrier aggregation.

BACKGROUND

Wireless communication systems, i.e. systems that provide communication services to wireless communication devices such as mobile phones, smartphones etc. (often denoted by UE that is short for user equipment), have evolved during the last decade into systems that must utilize the radio spectrum in the most efficient manner possible. A reason for this is the ever increasing demand for high speed data communication capabilities in terms of, e.g., bitrate and to provide these capabilities at any given time and at any geographical location.

To meet this demand for increased high speed data communication, within the third generation partnership project, 3GPP, work is being done regarding so-called carrier aggregation, CA. Carrier aggregation was introduced in Release 10 of the Evolved Universal Terrestrial Radio Access Network, E-UTRAN, standard as a means for qualifying E-UTRAN to meet the requirements for the fourth generation of mobile telecommunications technology, 4G, (specifying, e.g. 1000 Mbit/s data communication rate) as well as for allowing network operators with small (less than 20 MHz) scattered spectrum allocations to provide a good user experience by aggregating the scattered carrier allocations into e.g. 10, 20 MHz or more.

When utilizing CA, the UE is connected to a serving cell termed Primary Cell, PCell, on what is referred to as the Primary Component Carrier, PCC. Mobility is catered for on this carrier. In case the UE is using services that require high throughput, the network may activate one or more additional serving cells, each termed Secondary Cell, SCell, on what is referred to as Secondary Component Carrier(s), SCC. The activation by the network may happen before or after the SCell has been detected by the UE.

Different types of carrier aggregation scenarios are considered in the 3GPP work. These include intra-band contiguous aggregation, inter-band aggregation, intra-band non-contiguous aggregation and inter-node carrier aggregation. It can be foreseen that future application of CA will involve all of these types. For example, referring briefly to FIGS. 1a and 1b, at a given location of the UE, there may be multiple layers of cells/carriers, overlapping each other at least partially and there will be a more or less complex mix of large and small cells i.e. any combination of so-called macro (cell radius>2000 m), micro (cell radius 200-2000 m), pico (cell radius 10-200 m) and femto cells (cell radius 0-10 m) that are providing carriers at frequencies f1, f2, f3, f4 and f5, and a mix of intra-node and inter-node aggregation.

However, with such dense and ultra-dense deployment of cells, whereby the cells have small cell radii, it becomes challenging to provide mobility since the usable time of the cell, i.e. the time when the UE is within coverage and is receiving radio signals from that cell, becomes short when taking into account the interruption introduced by the required radio resource control, RRC, signaling for reconfiguring the UE before the new cell can be activated. Since dense and ultra-dense deployment is introduced to be able to serve a larger number of devices and to increase the throughput in the mobile communication system, if not being able to use those cells the end-user may see a severe drop in throughput while mobile. For example, EP 2696624 describes a procedure of handover of a UE between pico base stations.

SUMMARY

In view of the above, an object of the present disclosure is to overcome or at least mitigate at least some of the drawbacks related to dense and ultra-dense deployment of cells.

This is achieved in a first aspect by a method, performed by a network node in a wireless communication system. The wireless communication system provides carrier aggregation for a UE, and the UE is located in and connected to a PCell. The method comprises transmitting, to the UE, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell. The following steps are then repeated:
  obtaining monitoring data associated with the UE, where the monitoring data comprises spatial information regarding movement of the UE in relation to the at least one SCell,
  calculating, based on the monitoring data, at least one prediction of at least one subsequent predicted SCell into which the UE will enter,
  transmitting, to the UE, information that specifies the at least one predicted subsequent SCell,
  providing, to the at least one subsequent predicted SCell, preparation information that comprises information for the at least one subsequent predicted SCell that it is to operate as a SCell in relation to the UE.

In some embodiments, a determination is made whether or not the UE has switched from being connected to the current SCell to being connected to an one specific SCell among the at least one subsequent predicted SCell, and, if so, updating the monitoring data with information that comprises spatial movement of the UE into the specific SCell, whereby the specific SCell becomes the current SCell.

In a second aspect there is provided a method, performed by a UE. The UE is located in and connected to a PCell in a wireless communication system that provides carrier aggregation. The method comprises receiving, from a network node, initial configuration data that comprises information regarding at least one SCell, one of which is a current SCell to which the UE is to be connected, and at least one event triggering condition that defines radio signal measurement conditions for use by the UE when switching connection between a current SCell and a subsequent SCell. The UE connects to the current SCell and the following steps are repeated:
  receiving, from the network node, information that specifies at least one predicted subsequent SCell,
  measuring radio signals associated with the current SCell and radio signals associated with the at least one SCell,
  determining, based on the measuring of radio signals, an event according to the at least one event triggering condition and, if said event indicates that a specific SCell among the at least one SCell is better than the current SCell:

deactivating the current SCell and activating the specific SCell that is better than the current SCell, whereby the specific SCell becomes the current SCell, and providing, to the network node, a report that comprises information regarding the determined event and information regarding the activation of the specific SCell that is better than the current SCell.

In a third aspect there is provided a network node comprising input/output circuitry, a processor and a memory. The memory contains instructions executable by the processor whereby the network node is operative to:

transmit, to the UE, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell, and repeating the steps of:

obtain monitoring data associated with the UE, said monitoring data comprising spatial information regarding movement of the UE in relation to the at least one SCell, calculate, based on the monitoring data, at least one prediction of at least one subsequent predicted SCell into which the UE will enter, transmit, to the UE, information that specifies said at least one predicted subsequent SCell, provide, to the at least one subsequent predicted SCell, preparation information that comprises information for the at least one subsequent predicted SCell that it is to operate as a SCell in relation to the UE.

In a fourth aspect there is provided a UE comprising radio frequency, RF, circuitry, a processor and a memory. The memory contains instructions executable by the processor whereby the UE is operative to:

receive, from a network node, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell, connect to the current SCell, and repeating the steps of:

receive, from the network node, information that specifies at least one predicted subsequent SCell, measure radio signals associated with the current SCell and radio signals associated with said at least one SCell, determine, based on the measuring of radio signals, an event according to the at least one event triggering condition and, if said event indicates that a specific SCell among the at least one predicted subsequent SCell is better than the current SCell:

deactivate the current SCell and activating the specific SCell that is better than the current SCell whereby the specific SCell becomes the current SCell, and provide, to the network node, a report that comprises information regarding the determined event and information regarding the activation of the specific SCell that is better than the current SCell.

According to embodiments of these aspects, a network node may predict, from UE attributes and/or state, likely target SCells and pre-configures the UE with information about those SCells and prepare the predicted likely target SCells, allowing quick deactivation and activation when the UE reports one of the predicted target SCells as being better than then the existing current SCell.

An effect of this is that interruption on the secondary component carrier is minimized since both the most likely target SCell and the UE have been prepared on deactivating the current SCell and activating the target SCell, which becomes the new current SCell. That is, the procedure for transferring the UE from one SCell to the next SCell is shortened. As a consequence, the time the SCell can be used for communication increases, hence also densely deployed small cell (pico- and femtocells) networks can be utilized with good user and system throughput when the UE is mobile.

In other aspects there are provided a respective computer program, comprising instructions which, when executed on at least one processor in a node or a UE, cause the node or UE to carry out the respective methods as summarized above in connection with the first and second aspects and the various embodiments of these aspects.

In other aspects there are provided a respective carrier comprising a computer program according to the summarized aspects above, wherein the respective carrier is one of an electronic signal, an optical signal, a radio signal and a computer readable storage medium.

These other aspects provide the same effects and advantages as summarized above.

DETAILED DESCRIPTION

Figure 1A:
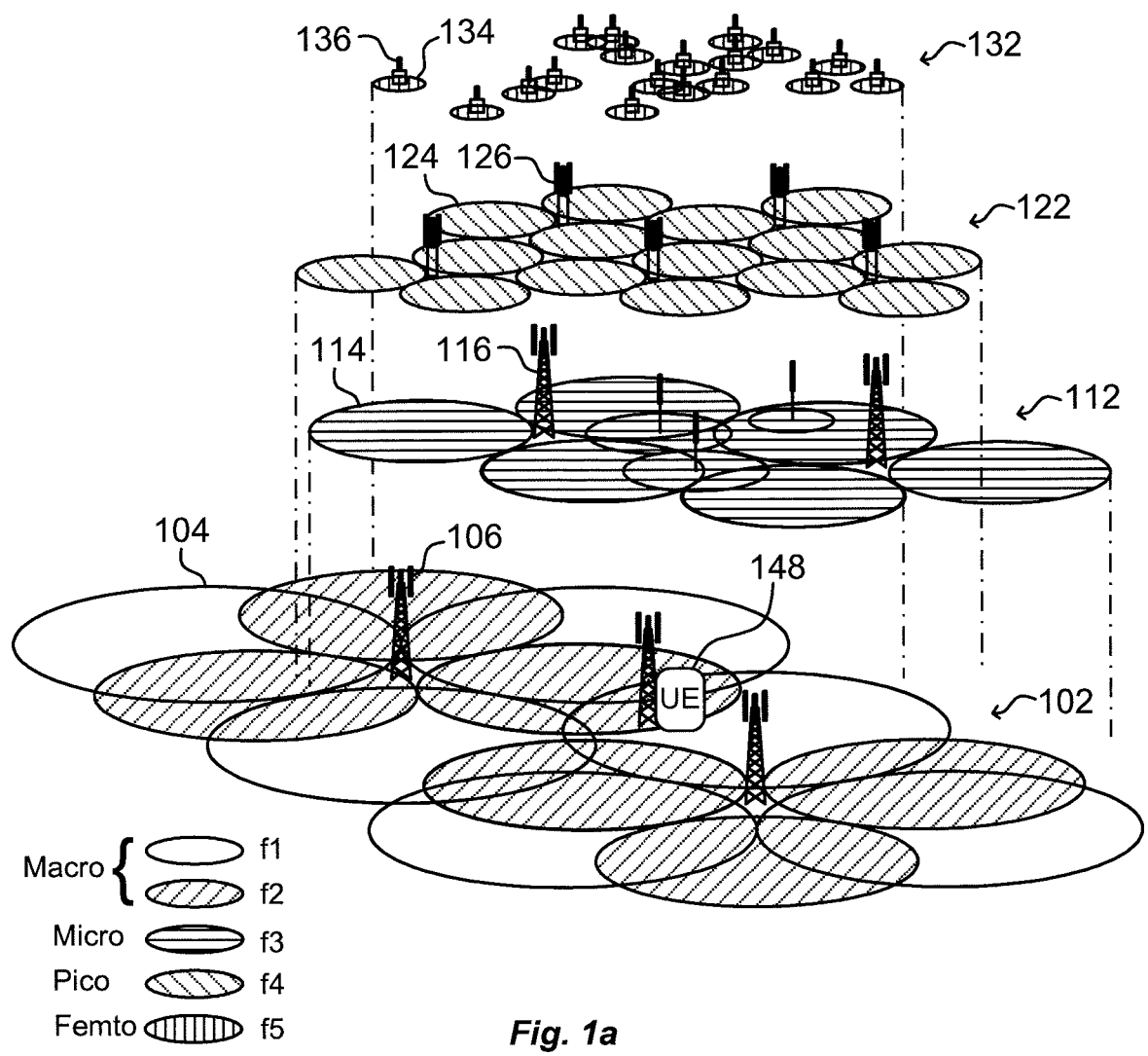
FIGS. 1a and 1b schematically illustrates a multi-layer carrier aggregation scenario, FIG. 2 schematically illustrates a wireless communication system.
Figure 1B:
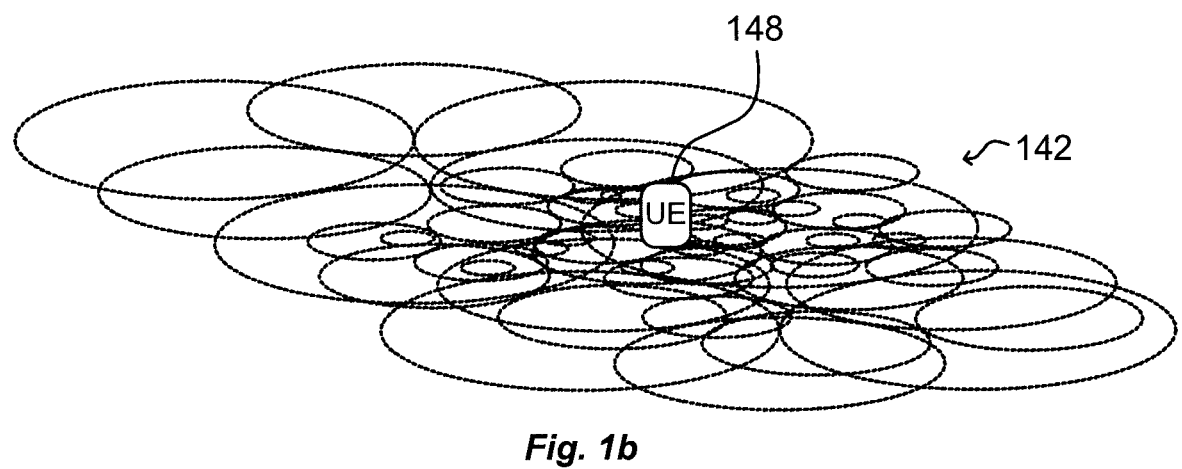

FIG. 1a schematically illustrates a scenario where a UE 148 is at a location where multiple layers 102, 112, 122, 132 of coverage by carriers/cells of base stations. Macro cells 104 are served by wide area, WA, base stations 106 (also known as high power nodes, HPN) by carriers f1 and f2. Micro cells 114 are served by micro nodes (also known as medium range, MR, base stations) by carrier f3. Pico cells 124 are served by pico nodes 126 (also known as local area, LA, base stations) by carrier f4, and femto cells 134 are served by femto nodes 136 (also known as home base station, HBS, relay nodes etc.) by carrier f5. In FIG. 1b, the dotted areas 142 represent the cell coverage experienced by the UE 148, illustrating the problems discussed above regarding the challenges of providing mobility with dense and ultra-dense deployment of cells, many of which cells have small cell radii.

Figure 2:
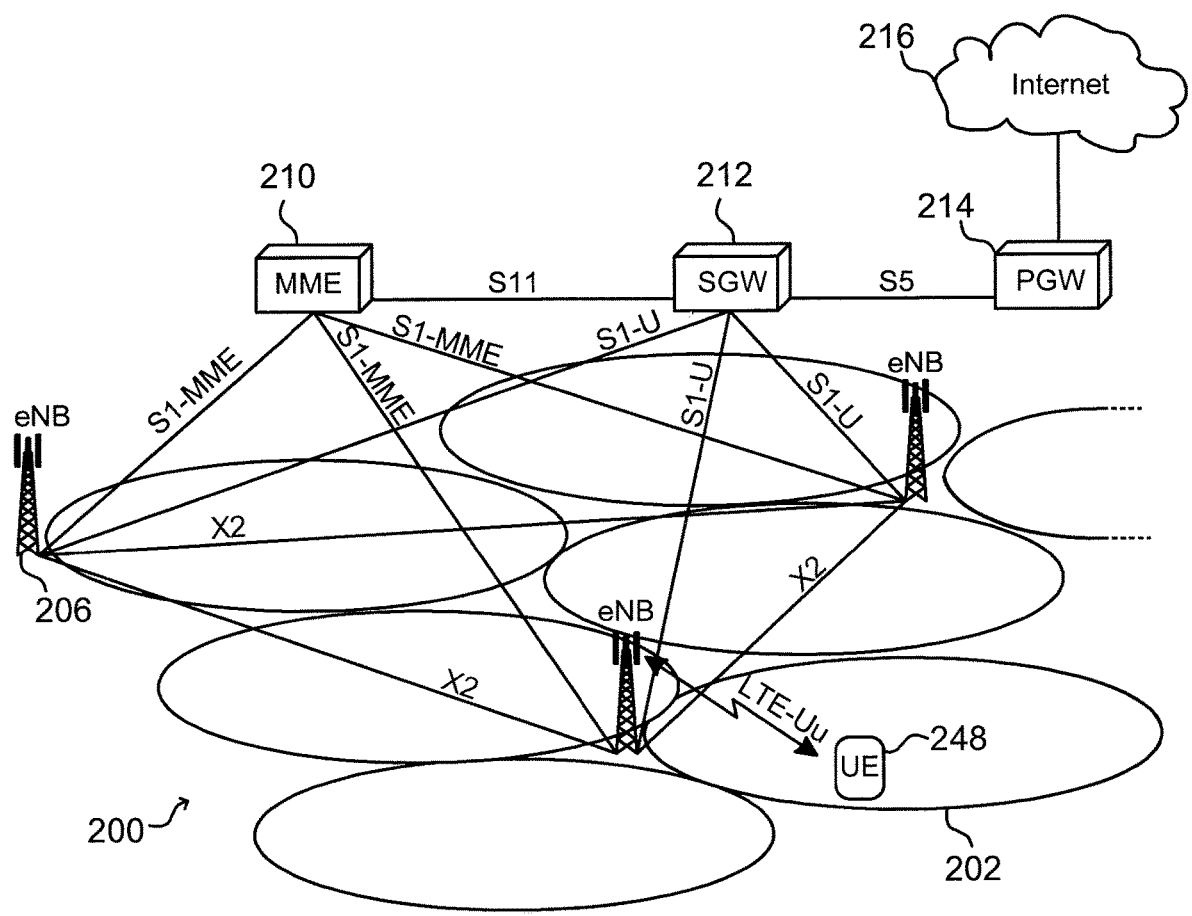
Figure 3:
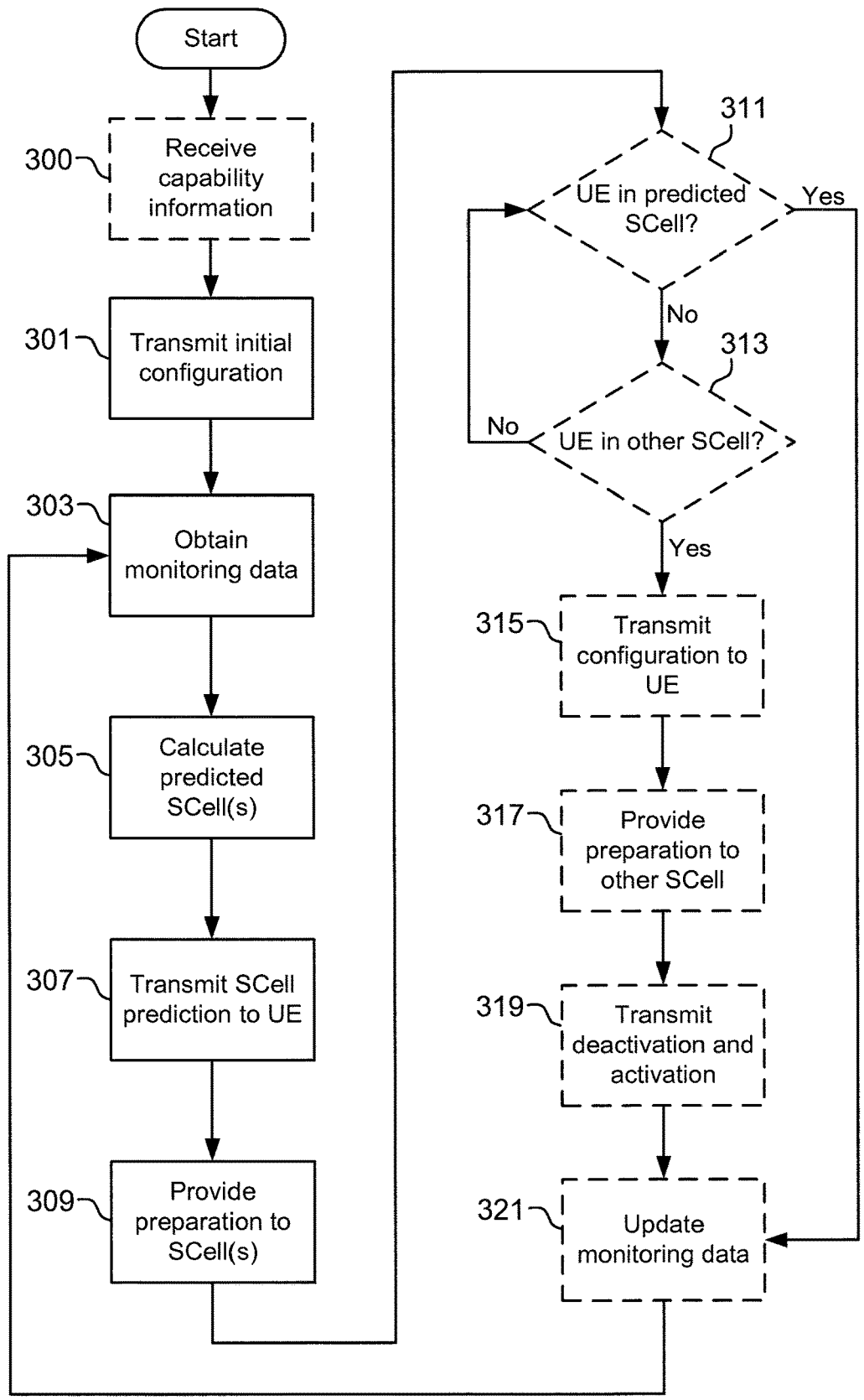
FIG. 3 is a flowchart of embodiments of a method in a node.

Turning now to FIG. 2 and FIG. 3 and with continued reference to FIG. 1, embodiments of methods in a node in a wireless communication system will be described in some detail. FIG. 2 is an example of a wireless communication system 200 in which these methods may be realized. The wireless communication system 200 comprises a number of base stations (for example in the form of evolved Node B's, eNB), 206 that provide carriers/cells 202 to a UE 248. The base stations 206 may correspond to any of the nodes/base stations 106, 116, 126, 136 described above in connection with FIG. 1. The base stations 206 are all connected to a mobile management entity, MME, 210 and a serving gateway, SGW, 212. Packet data connection, for example internet protocol, IP, connection to the Internet 216 is provided to the UE 248 via a packet data network gateway, PGW, 214 connected to the SGW 212. Also indicated in FIG. 2 are some of the communication interfaces that may be utilized between the different entities: the base stations 206 may communicate with each other via the X2 interface, with the MME 210 via the S1-MME interface and with the SGW 212 via the S1-U interface. The MME 210 and the SGW 212 may communicate via the S11 interface and the SGW 212 may communicate with the PGW 214 via the S5 interface. The UE 248 may communicate with the base stations 206 via a long term evolution, LTE, Uu interface.

It is to be noted that any of the layers 102, 112, 122, 132 of cells and base stations 106, 116, 126, 136 may correspond to similar entities in the wireless communication system 200 in FIG. 2.

The embodiments of a method that will be described in the following, with reference to FIG. 3, may be realized in any of the base stations 106, 116, 126, 136, 206 and the MME 210. It is assumed that the UE is already connected to a PCell. For example, referring to FIG. 1, the UE may be connected to a PCell of base station 106. The network node that performs the actions of the embodiments of the method may be a base station of the PCell and it may be another node in the system, such as a MME. The embodiments of the method will be described in terms of a number of steps or actions. Some of the actions are optional, which is illustrated in FIG. 3 by the dashed lines.

Action 301

Initial configuration data is transmitted to the UE. The configuration data comprises information regarding at least one secondary cell, SCell, one of which is a current SCell to which the UE is to be connected, and at least one event triggering condition that defines radio signal measurement conditions for use by the UE when switching connection between a current SCell and a subsequent SCell.

In other words, this may entail the network node configuring the UE with a serving (current) SCell, and event-triggered reporting (e.g. Event A6 as will be exemplified below) and further with event-triggered SCell activation.

Action 303

Monitoring data associated with the UE is obtained, where the monitoring data comprises spatial information regarding movement of the UE in relation to the at least one SCell.

For example, the network node may keep track of the UE trail, i.e., where the UE came from, and attributes (state) such as UE velocity, reported capabilities etc.

Action 305

Based on the monitoring data, a calculation is made of at least one prediction of at least one subsequent predicted SCell into which the UE will enter.

For example, when the UE enters a new SCell (as deduced from the obtained monitoring data), the network node may predict the most likely SCell(s) that the UE will enter next. The prediction may be based on collected history of UE trails and attributes, and may also be influenced by other information such as calendar and external input from geographical information systems, GIS, etc.

Action 307

Information that specifies said at least one predicted subsequent SCell is transmitted to the UE.

In other words, the network node preconfigures the UE with the most likely next SCell or SCells.

Action 309

Preparation information that comprises information for the at least one subsequent predicted SCell that it is to operate as a SCell in relation to the UE is provided to the at least one subsequent predicted SCell.

In other words, the network node prepares the SCcell or SCells for potential transfer of the UE.

Action 311

A determination may be made whether or not the UE has switched from being connected to the current SCell to being connected to one specific SCell among the at least one subsequent predicted SCell.

For example, as will be discussed in more detail below (e.g. in association with actions 413 and 417), this determination may include reception and analysis of event triggered reports from the UE that comprises information associated with radio measurements made by the UE.

Action 321

If the determination in action 311 finds that the UE has switched from being connected to the current SCell to being connected to one specific SCell, the monitoring data is updated with information that comprises spatial movement of the UE into the specific SCell, whereby the specific SCell becomes the current SCell.

For example, the network monitors whether the UE (autonomously for example) has activated a preconfigured SCell, as indicated by, e.g., an event-triggered indication. If so, the network node updates information about the UE trail, UE attributes (state), calendar information (time of day, date (workday, weekend, public holiday)), etc. for further refinement of future predictions. Continuation is then in action 303.

Action 313

In case the UE has not switched autonomously to a preconfigured SCell, as determined in action 311, the network node determines whether or not the UE has sent an event-triggered measurement report (or other kind of report) suggesting a non-preconfigured SCell to be better than the current SCell and preconfigured SCell(s). If it is found in this determination that this is not the case, the network node waits for any of those events to occur by returning to action 311.

Action 315

In case the UE has identified, as determined in action 313, a non-preconfigured SCell to be better than the preconfigured SCell(s), the network node may reconfigure the UE with the non-preconfigured SCell, e.g. by following an appropriate legacy procedure. The decision to do so may be influenced by history information; that is, the network node may be aware of that the UE just occasionally may come within coverage of the non-preconfigured SCell but anyway prefer it to go to a preconfigured SCell, e.g. to avoid ping-pong between SCells, and may therefore prefer the UE to stay in the current SCell until a preconfigured SCell has become better.

Action 317

After reconfiguring the UE in action 315, the network node prepares the target SCell for transfer. This may be done by providing suitable data (cf. action 309) to the target SCell, i.e. the better non-preconfigured SCell that has been identified in action 315.

Action 319

The network node sends a message, e.g. in the form of a medium access control, MAC, command, to the UE that deactivates the current SCell and activates the newly configured SCell, i.e. the better non-preconfigured SCell that has been identified in action 315. The monitoring data is then updated in action 321, as already described above, whereupon the iteration of actions 303 to 321 is continued.

Figure 4:
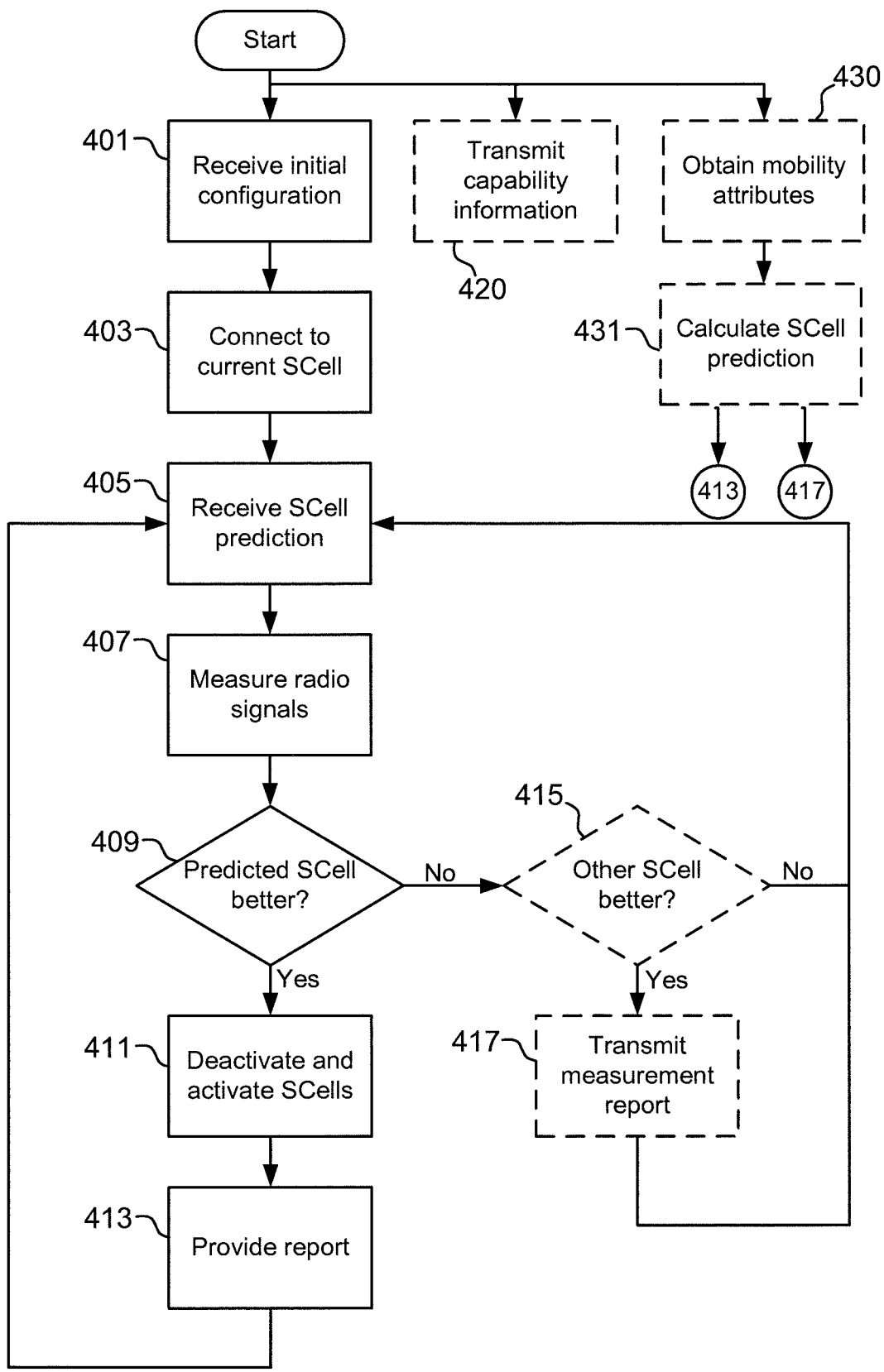
FIG. 4 is a flowchart of embodiments of a method in a UE, FIG. 5 schematically illustrates coverage of SCells in a shopping mall, FIG. 6 schematically illustrates coverage of SCells in a road and railway traffic context, FIG. 7 schematically illustrates a block diagram of a node, FIG. 8 schematically illustrates a block diagram of a UE, FIG. 9 schematically illustrates a block diagram of a node, and FIG. 10 schematically illustrates a block diagram of a UE.

The embodiments of a method that will be described in the following, with reference to FIG. 4, are realized in a UE such as the UE 148 in FIG. 1 and the UE 248 in FIG. 2. As for the method in the network node, the embodiments of the method in the UE will be described in terms of a number of steps or actions. Some of the actions are optional, which is illustrated in FIG. 4 by the dashed lines.

Action 401

Initial configuration data is received from a network node, where the initial configuration data comprises information regarding at least one secondary cell, SCell, one of which is a current SCell to which the UE is to be connected, and at least one event triggering condition that defines radio signal measurement conditions for use by the UE when switching connection between a current SCell and a subsequent SCell.

This action may entail configuring the UE with an SCell and preconfigured with SCell(s) for potential transfer when leaving the coverage of the current SCell. Further, the UE is configured with event-triggered reporting (e.g. Event A6) and event-triggered SCell activation.

Action 403

The UE connects to the current SCell by way of an appropriate connection procedure.

Action 405

With action 405 an iteration (loop) commences in that information that specifies at least one predicted subsequent SCell may be received from the network node.

Action 407

Measuring takes place of radio signals associated with the current SCell and radio signals associated with said at least one SCell.

This may take place by the UE by measuring the SCells indicated by the reception in action 401 on their respective SCC.

Action 409

A determination is made, based on the measuring of radio signals, of an event according to the at least one event triggering condition.

Action 411

If the determination action 409 finds that the event indicates that a specific SCell among the at least one predicted SCell is better than the current SCell, then the current SCell is deactivated and the specific SCell that is better than the current SCell is activated whereby the specific SCell becomes the current SCell.

Action 413

A report is provided to the network node, where the report comprises information regarding the determined event and information regarding the activation of the specific SCell that is better than the current SCell.

In other words, the UE provides an indication to the network that a preconfigured SCell has been activated. The iteration of actions then returns to action 405.

Action 415

In case the determination action 409 is that no event indicates that a specific SCell among the at least one predicted SCell is better than the current SCell, then a determination is made in action 415 of an event that indicates whether or not a specific SCell that is not among the at least one predicted SCell is better than the current SCell.

Action 417

If it is found, in action 415, that the event indicates that a specific SCell that is not among the at least one predicted SCell is better than the current SCell, then an event-triggered measurement report is transmitted to the network node.

If, in action 415, it is found that no specific SCell that is not among the at least one predicted SCell is better than the current SCell, then the iteration of actions returns to action 405.

Exemplifying embodiments of the above actions will now be described. For example, with regard to the number of cells can be preconfigured at the UE as SCells depends mainly on one or more of the following factors:

- Total number of SCells that can be indexed in the MAC command for activation/deactivation. In the current standard (i.e. release 12 of the 3GPP standard) this number is 5, including the PCell, but an increase is expected in future releases of the standard;
- Number of configured component carriers and number of configured SCells for those carriers (5 carriers are considered for release 12; if more SCell indexes are used by other carriers, fewer can be used for this carrier);
- Acceptable overhead for RRC signaling of multiple potential target SCells;
- UE capability related to the maximum number of cells which can be preconfigured at the UE (see below);
- UE capability related to type(s) of CA supported by the UE. Examples of types of CA are: intra-band contiguous CA, intra-band non-continuous CA, inter-band CA, and any combination thereof.

With regard to how the network node may configure the UE with the most likely neighbor SCell(s) to enter next, for example in actions 301 to 307, the network node may use one or more of the following set of information to predict or determine one or more SCells in which the UE is expected to enter at a future time:

1. Pre-determined information related to the deployment of one or more SCells in the vicinity of the UE or in the coverage area where the UE is currently located. Examples of information related to the deployment of SCells are geographical coordinates, cell topology (e.g. coverage area of cell, cell range or radius etc), inter-site distance between cells etc.
2. UE mobility attributes or state (as will be described in detail below).
3. Statistics of UE trails.

UE mobility attributes (a.k.a. UE mobility state or, more generally, spatial information regarding movement) are characterized by at least the UE speed. But they may also be characterized by one or more additional characteristics such as UE location, UE direction of motion, UE acceleration, UE trajectory etc. One or more of these attributes can be estimated by the UE and/or by the network node.

The above stated UE mobility attributes can be obtained by measuring signals transmitted by the UE in which case the corresponding measurements are performed in the network node, e.g. in the serving network node such as the PCell. The UE mobility attributes can also be obtained by using measurements done by the UE and reported to the network node, e.g. transmitted by the UE as part of action 413 or action 417 and received by the network node as part of action 303. More specifically these different attributes may be determined as follows:

- UE speed. It may also be interchangeably denoted UE velocity. For example, UE speed may be obtained by measuring a Doppler speed of the UE. It can also be obtained by a Global Navigation Satellite System, GNSS, or an assisted GNSS, A-GNSS, receiver in the UE;
- UE location. It comprises of UE geographical coordinates or UE position with respect to a known or pre-determined location. It can be obtained by using a suitable positioning method such as Enhanced cell ID (ECID), Observed Time Difference Of Arrival, OTDOA, GNSS, A-GNSS, any combination of ECID, OTDOA, GNSS and A-GNSS systems etc;
- UE direction of motion. It can be obtained by measuring direction of arrival of signal such as an angle of arrival measurement performed by the network node. This can be performed if the network node has multiple received antennas or antenna arrays;
- UE acceleration. It can be measured by observing the change in the UE speed over certain time period;
- UE trajectory. This is an overall path of motion over certain time or between any locations of the UE etc. This can be represented by two or more sets of geographical coordinates along the trajectory traversed by the UE.

The UE may transmit one or more of these mobility attributes to the network node if they are determined by the UE and used by the network node for preconfiguring one or more SCells. This is illustrated in FIG. 4 by action 430 and the corresponding reception in the network node is then included in action 303 where monitoring data is obtained.

Similarly the network node may transmit (e.g. in the transmission of the prediction in action 307) one or more of these determined attributes to the UE if they are determined by the network node and are required by the UE for recommending the pre-configuration of one or more SCells. For example if UE has information about deployment of cells (e.g. preconfigured maps for UE based positioning such as for fingerprinting) then the UE can use this information and the UE mobility attributes to identify one or more cells for pre-configuration as SCell(s), for example in a calculation step 431 illustrated in FIG. 4. The UE can send this information to the network node (e.g. as part of the reports in actions 413 and/or action 417), which can this into account when preconfiguring SCells based on its own assessment. In some embodiments one of more attributes may also be determined by both UE and the network node, and the UE or network node can obtain the final value based on the values determined by both UE and network node. This could be done based on a function of values determined by the UE and the network node; examples of functions are average, maximum, minimum, percentile etc.

With regard to how the event triggered SCell deactivation/activation may operate (i.e. referring to actions 409-417 in FIG. 4), one or more new events may be introduced:

Event X1 is an example of a relative event which is triggered based on the outcome of the comparison of the signal measurements performed on the two serving cells by the UE, an action is taken by the UE and also reported by the UE to the network node.

Event X2 is an example of an absolute event which is triggered based on the outcome of the comparison of the signal measurement performed by the UE on the preconfigured SCell with a threshold, an action is taken by the UE and reported by the UE to the network node.

Event X3 is an example of an absolute event which is triggered based on the outcome of the comparison of the signal measurement performed by the UE on the current SCell with a threshold, an action is taken by the UE and reported by the UE to the network node.

The reports of the events may take place during action 413 or action 417.

The network node can configure UE with event X1, or events X2 and X3, or all the three events. As described above, this configuration may take place in action 301 in the network node and corresponding action 401 in the UE.

It is worth noting here that there are prepared cells (i.e. predicted subsequent SCells) that both the network node (e.g. an evolved NodeB, eNB) and UE knows about, and if those cells trigger the special event the UE can do some things at once without waiting for eNB orders. The typical UE action is to send a measurement report but for these special events the UE can do more than that. The UE can also be more selective since only preconfigured SCells will trigger the events.

The events X1, X2 and X3 are elaborated below:

Event X1:
Preconfigured SCell becomes offset better than reference SCell

Entering condition: $Mcn+Occn-Hys>Ms+Ocs+Off$
Leaving condition: $Mcn+Occn+Hys<Ms+Ocs+Off$
where reference SCell is one of the currently used SCell(s) and where:

- Mcn: Measurement result for a configured intra-frequency neighbor SCell, without any offset;
- Occn: Cell-specific offset of configured intra-frequency neighbor SCell; set to zero if not provided;
- Hys: Hysteresis parameter for this event;
- Ms: Measurement of the serving cell, without any offset;
- Ocs: Cell-specific offset of the serving cell; set to zero if not provided; and
- Off: Offset parameter for this event.

Mcn and Ms are expressed in dBm in case of reference signal received power, RSRP, and dB in case of reference signal received quality, RSRQ. Occn, Ocs, Hys and Off are expressed in dB The UE may perform the following upon entering:
- Autonomously deactivate the current SCell (serving cell);
- Indicate to the PCell, i.e to the network node, that the serving cell has been deactivated;
- Autonomously initiate activation of the configured intra-frequency SCell for which the entering condition was met;
- Indicate to the PCell, i.e. to the network node, that activation has been initiated for configured intra-frequency SCell for which the entering condition was met;
- Potentially send an event-triggered measurement report to the network node to allow fingerprinting of where the UE switched cell.

The network node may perform the following upon getting indications from the UE:
- Immediately redirect "data streams" from previous serving cell to the new serving cell;
- At suitable occasion, reconfigure UE with a set of likely (i.e. predicted) SCell(s) to enter, and prepares those predicted SCells for potential activation.

Event X2:
Preconfigured SCell becomes better than first threshold
Event X3:
Reference SCell becomes worse than second threshold
The UE may for instance indicate to the network node that the current SCell is deactivated by sending an event-triggered channel quality indicator, CQI, report where the new SCell is included. Before having calculated a valid CQI in the new SCell, the UE may for instance use CQI value 0, similar to how it is done for regular SCell activation (see 3GPP TS 36.133 V12.3.0 section 7.7). The previous SCell may for instance be omitted in the report, and the network node interprets this as the UE having autonomously changed SCell.

Other alternatives may include indicating the same as above using the first regular CQI reporting opportunity after the autonomous SCell change. In this case the UE may already have derived a valid CQI value for the new SCell (depending on configuration of periodic CQI reporting).

Since the UE already knows the target cell when autonomously switching SCell, it is expected that from UE side this procedure will be faster than the regular SCell activation described in 3GPP TS 36.133 V12.3.0 section 7.7.

This event may be configured together with e.g. Event A6 to allow the UE also to indicate to the network node that another cell than the already configured SCell caused the event.

With regard to the UE providing information about the UE's capability in terms of handling preconfiguration of SCells, the UE may transmit a capability information to the network node to inform the network node whether the UE is capable of being preconfigured with one or more SCells, which are to be used as SCell(s) at a future time when one or more condition is met (as described above). More specifically, the UE may indicate in a capability information message (actions 420 in the UE and action 300 in the network node) that it is capable of performing the methods as described above. The capability information may be transmitted via higher layer signaling (e.g. RRC signaling) to the network node. The information may be sent during an initial call setup or after cell change (e.g. handover etc) or during the session or call.

The UE capability information may also contain additional or more specific information such as:
  UE is capable of being preconfigured with a maximum of N number of SCells (e.g. N=3).
  UE is capable of being preconfigured with a maximum of K number of SCells (e.g. K=2) if they belong to different frequency bands.
  UE is capable of being preconfigured with one or more SCells in the same frequency band as that of the PCell.
  UE is capable of being preconfigured with one or more SCells in the same frequency band as that of the reference SCell (e.g. current SCell).
  UE is capable of autonomously activating and deactivating preconfigured and current SCells.
  UE is capable of evaluating, triggering and taking actions related to any one or more of the events described above The acquired UE capability information may be used by the network node for performing one or more radio operation tasks or network management tasks:
  The task comprises forwarding the received UE capability information to another network node which may use it after cell change of the UE e.g. from serving eNode B to neighboring eNode B over X, from core network node (e.g. MME) to eNode B etc;
  The network node preconfigures the UE with one or more SCell(s) only if the UE supports such capability.
  The network node preconfigures the UE with not more than the maximum number of SCell(s) as indicated by its capability information, e.g. N=3.
  The network node may store the received capability information and use it in future, e.g. when the same UE is to be preconfigured with one or more SCells.

With regard to an example where the UE is handed over from the PCell in which it is connected (source PCell), to a subsequent neighboring PCell, the source PCell may forward information on the UE trail and/or UE attributes (state) to the neighboring PCell. The UE trail includes at least the last used SCell on concerned carriers in the border area between the PCells. This information allows the target PCell to prepare for quick activation of the most likely SCell(s) immediately after the completed handover without waiting for a first measurement report from the UE.

The network node handling the source PCell may alternatively or additionally indicate the physical cell identities, PCI, of suitable target SCell, to further prepare the network node handling the target PCell. Both the target and the source network nodes may have acquired such information e.g. by analyzing measurement reports from UEs following that trail in the past.

Figure 5:
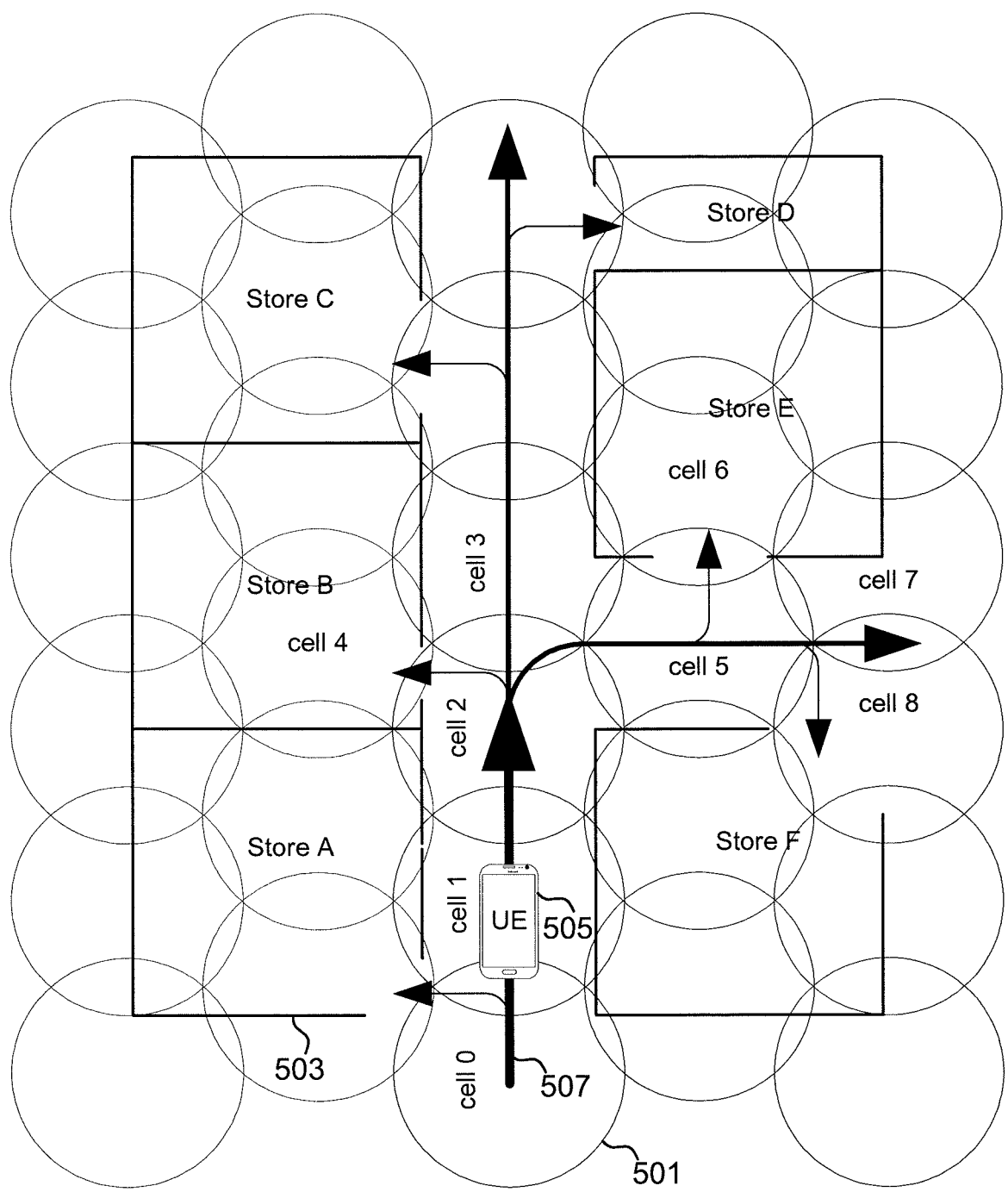

Turning now to FIG. 5, an illustrative scenario will be described where a UE 505 is moving in an indoor environment of a shopping mall 503 comprising a plurality of stores (denoted Store A, Store B etc. in FIG. 5). The UE 505 communicates with a network node (not shown in FIG. 5) and the UE is connected to a PCell (not illustrated in FIG. 5), such as a macro cell in a macro layer (e.g. layer 102 in FIG. 1). The areas of the stores in the shopping mall is covered by a plurality of SCells 501 that are denoted cell1 cell2 etc. in FIG. 5. The possible trails or paths of movement of the UE 505 are illustrated by black arrows 507 in FIG. 5.

As exemplified above, the network node may collect, from a plurality of UE's in the shopping mall such as the UE 505, UE mobility attributes and/or statistics of UE trails. This may be done via event-triggered or periodic reporting of measurements, and/or via sequences of deactivation and activation of SCells (as described above in connection with FIGS. 3 and 4). The network node may find, based on this data, that a larger percentage say X % (e.g. X=90%) of the UEs that are entering Cell 1 from Cell 0, continue to Cell 2.

Similarly the network node may find that 40% of the UEs that are entering Cell 2 from Cell 1 continue to Cell 3, and another 50% to Cell 5. Further the network node may find that 90% of UEs that are entering Cell 5 enter Cell 7 or 8 with same probability. The information about the cells (e.g. cell 1-8) where the UE is operating can be determined by the network node based on, for example, the pre-determined information about the deployment (as described above).

Some UEs will turn back to where they came from, and some UEs will enter other cells, e.g. UEs carried by customers to Store B will leave Cell 2 and go to Cell 4, but the majority of the UEs will follow predictable trails due to physical obstacles such as walls along the corridors, etc.

In order for the network node to speed up switching of SCell for the UE 505, more particularly to avoid delay due to RRC signaling between network node and the UE 505, the network node may configure already beforehand the most likely SCell the UE 505 will continue to next.

In the shopping mall example, already when the UE 505 enters Cell 1 from Cell 0, the network node configures Cell 2 as SCell, along current configurations of serving Cell 1 and previous Cell 0. Immediately when the network node has decided that the UE 505 is within coverage of Cell 2 (from event-triggered or periodic reporting of measurements as described above), it may send a MAC command to the UE 505 to activate Cell 2 and deactivate Cell 1. It may then configure Cells 3 and 5 as SCells, and release Cell 0 which no longer is a likely next cell, for example via a RRCConnectionReconfiguration message (see 3GPP TS 36.331 V12.1.0 section 6.2.2).

In the relatively rare event that the UE 505 will leave Cell 2 for Cell 4 (i.e. entering Store B), the network node may upon finding that Cell 4 is better than Cell 2, deactivating Cell 2, reconfiguring Cell 4 as SCell, releasing Cell 1 (no longer a next cell), and then some time later activate the Cell 4.

The benefit from this approach is that the majority of users of the UE 505 at any given time will have an almost seamless mobility with high throughput as long as they follow a route in the shopping mall 503 that a majority of UEs have done historically. Occasionally, when diverting from the most likely route, a user of the UE 505 will experience a short-lived degradation due to the network node falling back to legacy procedure for transferring the UE 505 from one SCell to another.

A further benefit is that by preconfiguring the next SCell the usable time of the cell can be prolonged for the cases when the UE 505 is moving at a relatively high velocity compared to the cell radius. Without preconfiguring the next SCell the RRC signaling will add to the interruption time and may lead to that the usable time in the cell is too short for making sense to activate it for the UE.

The network node may also identify some cells where it does not make sense to predict the next cell, since there would be too many option and call for too many potential next cells to be configured. For such cells the network node may simply use a legacy procedure for transferring the UE between the SCells.

Figure 6:
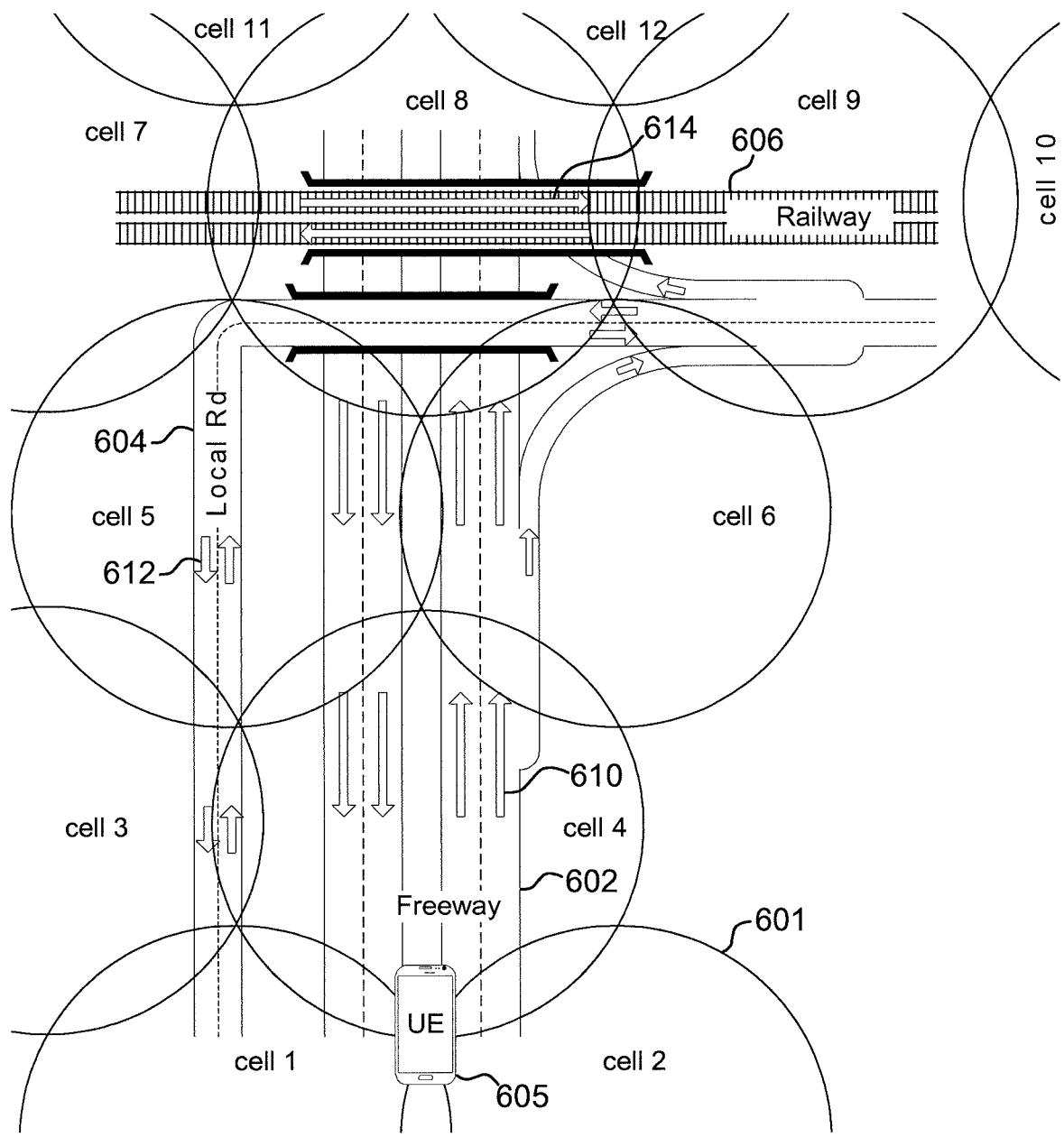

Turning now to FIG. 6, an illustrative scenario will be described where a UE 605 illustrates movement in an outdoor environment in traffic. Traffic paths in the scenario indicate how traffic going along a freeway 602 moves at a relatively high speed 610, traffic along a local road 604 moves at a relatively low speed 612 and traffic along a railway 606 moves at a very high speed 614. The UE 605 communicates with a network node (not shown in FIG. 6) and the UE 605 is connected to a PCell (not illustrated in FIG. 6), such as a macro cell in a macro layer (e.g. layer 102 in FIG. 1). The different traffic paths are covered by a plurality of SCells 601 that are denoted cent cell2 etc. in FIG. 6.

The network node takes speed into account to determine or refine the prediction (i.e. in action 305) of the next cell for the UE 605 to enter. When the UE 605 enters cell 6 from cell 4 at high speed is likely to continue on the freeway, and hence the likely next SCell is cell 8. On the other hand, in case the UE 605 follows the same trail but travelling at low speed when entering cell 6, it is likely to take the exit, and hence the next likely SCell is cell 9. Therefore when the network node observes that the UE 605 follows this trail it uses also UE speed to decide whether to preconfigure cell 8 (continue on the freeway) or cell 9 (exiting the freeway).

Similarly, a UE entering cell 8 from ell 9 is most likely either traveling along the railway 606 or along the local road 604. The trains are passing at considerably higher speed than the speed limit of the local road 604. Hence by taking UE speed into account, the network node can decide whether to preconfigure cell 7 (continue along the railway) or cell 5 (follow the local road).

Similarly, a UE entering cell 5 from cell 8 at low speed is likely traveling along the local road 604, whereas a UE doing the same but at high speed is more likely to be traveling on the freeway 602. Hence with the additional information of UE speed, the network node can decide whether to preconfigure cell 3 (traveling along the local road 604) or cell 4 (traveling on the freeway 602).

The same principle can be used to distinguish between UEs traveling along a road by car, and UEs traveling nearby to the road on e.g. cycle paths (lower velocity), or to distinguish pedestrians on a sidewalk from cyclists on a cycle path.

It is to be noted that the network node does not have to know anything about the presence of roads, railways etc, nor does it have to know where such infrastructure crosses the cells, or even the exact location and coverage of the cells. It builds and refines its knowledge based on observed UE behavior (as obtained in action 303). Additional information may of course be provided e.g. manually, from other network nodes (UE trail in previous PCell(s) before entering the current one, etc.), and from servers in a cloud (e.g. carrying information about layout of infrastructure, e.g. a GIS server.

It is also to be noted that the network node, when predicting (action 305) the most likely next cell, also may take into account time-dependent traffic patterns, e.g. commuting, with heavy traffic along particular routes at particular time of day and particular days of a week. Here too additional information may be used to enhance the prediction further, e.g. calendar information about working days, public holidays, weekends, etc., for instance provided via a server in a cloud. For instance, at rush hour the network node may identify that the traffic is running very slow due to traffic jams, while at the same time there are many users in the cells. For a large number of slow-moving UEs on the freeway it may then fall back to legacy procedures in parts of the macro cell coverage areas where it may be hard to predict the next likely cell to enter—for instance whether a UE is to continue on, or exit, the freeway 602 in cell 6. Since the concerned UEs are moving slowly, the usable time in each SCell increases and the interruption due to legacy procedure for transferring the UE from one SCell to the next can be afforded. Alternatively, if capacity allows (with respect mainly to the network node and inter-node signaling, if needed), the network node may configure the UE with several SCells, to cover more than one outcome (e.g., while UE 605 is in cell 6 preconfiguring both cell 8 and cell 9).

Figure 7:
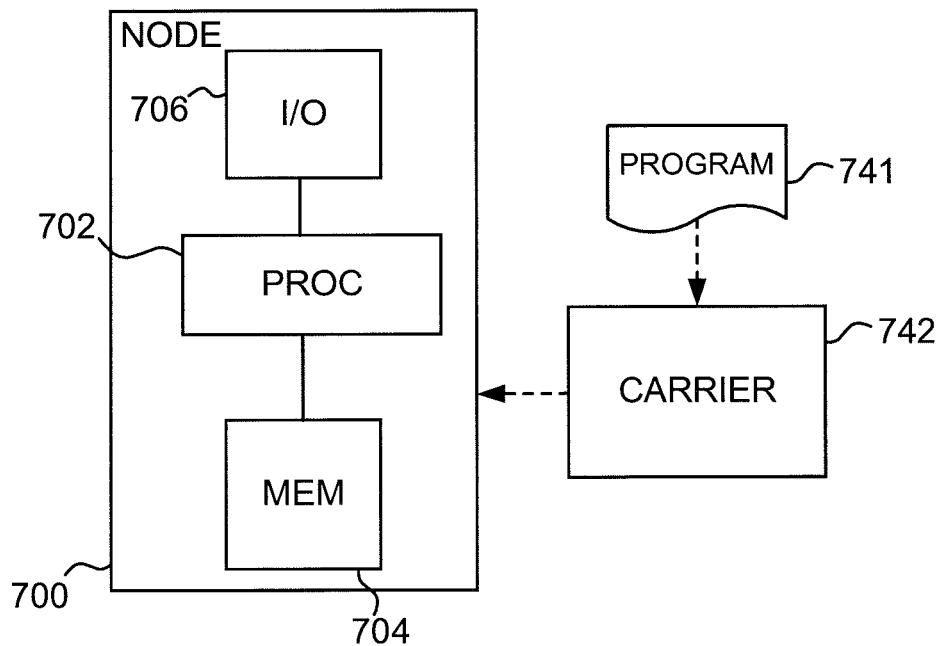

Turning now to FIGS. 7 to 10, embodiments of a node and a UE will be described in some more detail. FIG. 7 schematically illustrates a network node 700 comprising input/output circuitry 706, a processor 702 and a memory 704. The memory 704 contains instructions executable by the processor 702 whereby the node 700 is operative to:

transmit, to a user equipment. UE, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell, and repeating the steps of:

obtain monitoring data associated with the UE, said monitoring data comprising spatial information regarding movement of the UE in relation to the at least one SCell, calculate, based on the monitoring data, at least one prediction of at least one subsequent predicted SCell into which the UE will enter, transmit, to the UE, information that specifies said at least one predicted subsequent SCell, provide, to the at least one subsequent predicted SCell, preparation information that comprises information for the at least one subsequent predicted SCell that it is to operate as a SCell in relation to the UE.

In some embodiments, the network node 700 is operative to determine whether or not the UE has switched from being connected to the current SCell to being connected to one specific SCell among the at least one subsequent predicted SCell, and, if so:
update the monitoring data with information that comprises spatial movement of the UE into the specific SCell, whereby the specific SCell becomes the current SCell.

In some embodiments, the network node 700 is operative such that the at least one event triggering condition is configured for triggering any event of:
event X1 being triggered by the UE based on an outcome of a comparison of signal measurements performed on the current SCell and the at least one predicted subsequent SCell by the UE,
event X2 being triggered by the UE based on an outcome of a comparison of a signal measurement performed by the UE by comparing the at least one predicted subsequent SCell with a threshold, and
event X3 being triggered based on an outcome of a comparison of a signal measurement performed by the UE on the current SCell with a threshold.

In some embodiments, the network node 700 is operative such that the obtaining of monitoring data comprises receiving mobility attributes associated with the UE, and configured such that:
the calculation of at least one prediction of at least one subsequent predicted SCell into which the UE will enter comprises using the received mobility attributes.

In some embodiments, the network node 700 is operative such that the obtaining of monitoring data comprises determining mobility attributes associated with the UE, and configured such that:
the transmission of information that specifies said at least one predicted subsequent SCell comprises transmission of said mobility attributes, and
the calculation of at least one prediction of at least one subsequent predicted SCell into which the UE will enter comprises using the received mobility attributes.

In some embodiments, the network node 700 is operative to:
receive, from the UE, information regarding the UE capability of being preconfigured with one or more SCells for use as one or more SCell at a future time, and wherein the initial configuration data comprises at least part of said information regarding the UE capability.

In some embodiments, the network node 700 is operative to determine that a handover to a subsequent PCell is in progress, and in response to this determination, provide information regarding to the subsequent PCell, said information comprising any of UE movement and mobility attributes associated with the UE.

The instructions that are executable by the processor 702 may be software in the form of a computer program 741. The computer program 741 may be contained in or by a carrier 742, which may provide the computer program 741 to the memory 704 and processor 702. The carrier 742 may be in any suitable form including an electronic signal, an optical signal, a radio signal or a computer readable storage medium.

Figure 8:
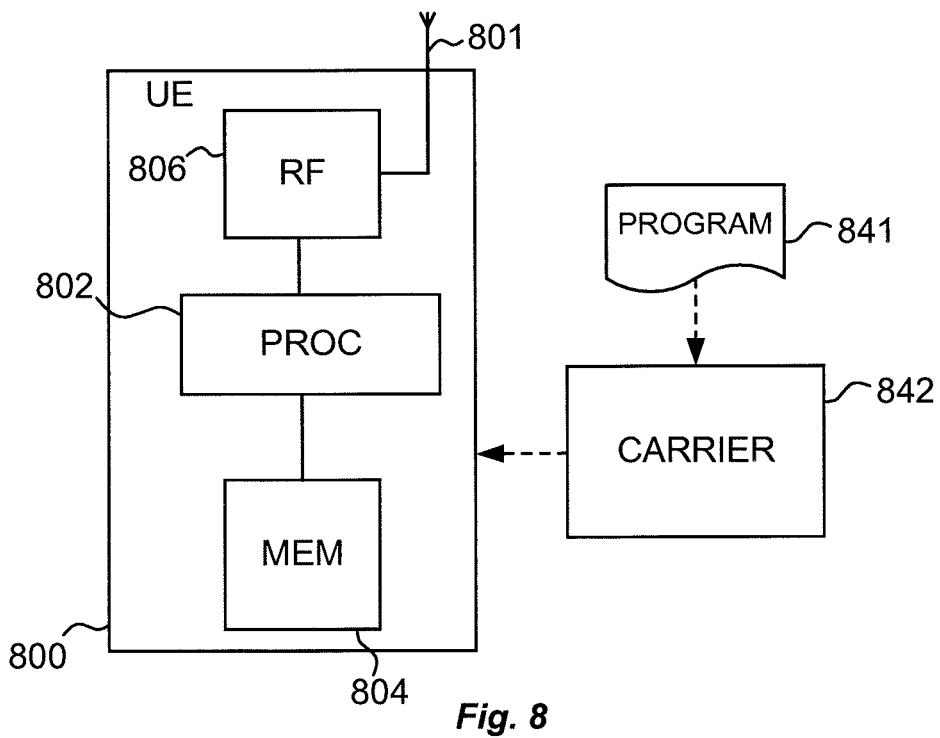

FIG. 8 schematically illustrates a user equipment, UE, 800. The UE comprises radio frequency, RF, circuitry 806, a processor 802 and a memory 804. The memory 804 contains instructions executable by the processor 802 whereby the UE 800 is operative to:
receive, from a network node, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell,
connect to the current SCell, and repeating the steps of:
receive, from the network node, information that specifies at least one predicted subsequent SCell,
measure radio signals associated with the current SCell and radio signals associated with said at least one SCell,
determine, based on the measuring of radio signals, an event according to the at least one event triggering condition and, if said event indicates that a specific SCell among the at least one predicted subsequent SCell is better than the current SCell:
deactivate the current SCell and activating the specific SCell that is better than the current SCell whereby the specific SCell becomes the current SCell, and
provide, to the network node, a report that comprises information regarding the determined event and information regarding the activation of the specific SCell that is better than the current SCell.

In some embodiments, the UE 800 is operative such that the at least one event triggering condition is configured for triggering any event of:
event X1 being triggered by the UE based on an outcome of a comparison of signal measurements performed on the current SCell and the at least one predicted subsequent SCell by the UE,
event X2 being triggered by the UE based on an outcome of a comparison of a signal measurement performed by the UE by comparing the at least one predicted subsequent SCell with a threshold, and
event X3 being triggered based on an outcome of a comparison of a signal measurement performed by the UE on the current SCell with a threshold.

In some embodiments, the UE 800 is operative to:
determine, if no event is determined that indicates that a specific SCell among the at least one predicted subsequent SCell is better than the current SCell, an event that indicates whether or not a specific SCell that is not among the at least one predicted SCell is better than the current SCell, and if said event indicates that a specific SCell that is not among the at least one predicted SCell is better than the current SCell:
provide, to the network node, a report that comprises information regarding the determined event and information regarding the activation of the specific SCell that is not among the at least one predicted SCell and that is better than the current SCell.

In some embodiments, the UE 800 is operative to:
obtain mobility attributes associated with the UE, and wherein the provision of a report to the network node comprises providing said mobility attributes.

In some embodiments, the UE 800 is operative to:
calculate, based on the monitoring data, at least one prediction of at least one subsequent predicted SCell into which the UE will enter, and wherein the provision of a report to the network node comprises providing said prediction of at least one subsequent predicted SCell.

In some embodiments, the UE 800 is operative to:
transmit, to the network node, information regarding the UE capability of being preconfigured with one or more SCells for use as one or more SCell at a future time.

The instructions that are executable by the processor 802 may be software in the form of a computer program 841. The computer program 841 may be contained in or by a carrier 842, which may provide the computer program 841 to the memory 804 and processor 802. The carrier 842 may be in any suitable form including an electronic signal, an optical signal, a radio signal or a computer readable storage medium.

Figure 9:
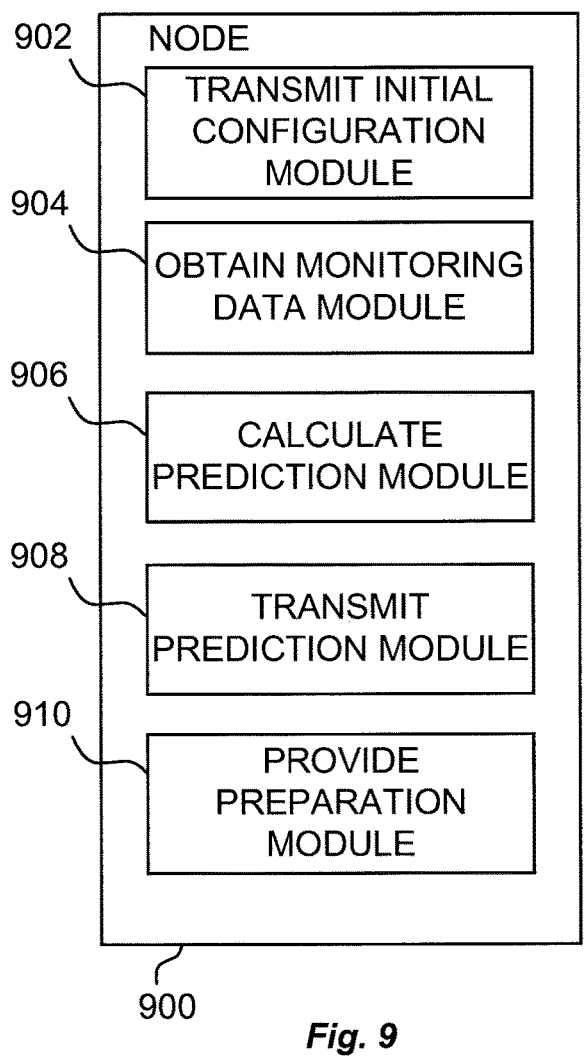

FIG. 9 illustrates schematically a network node 900 that comprises:
- a transmit module 902 configured to transmit, to a user equipment, UE, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell, and repeating the steps of:
- an obtain module 904 configured to obtain monitoring data associated with the UE, said monitoring data comprising spatial information regarding movement of the UE in relation to the at least one SCell,
- a calculate module 906 configured to calculate, based on the monitoring data, at least one prediction of at least one subsequent predicted SCell into which the UE will enter,
- a transmit module 908 configured to transmit, to the UE, information that specifies said at least one predicted subsequent SCell,
- a provide module 910 configured to provide, to the at least one subsequent predicted SCell, preparation information that comprises information for the at least one subsequent predicted SCell that it is to operate as a SCell in relation to the UE.

The node 900 may comprise further modules that are configured to perform in a similar manner as, e.g., the node 700 described above in connection with FIG. 7.

Figure 10:
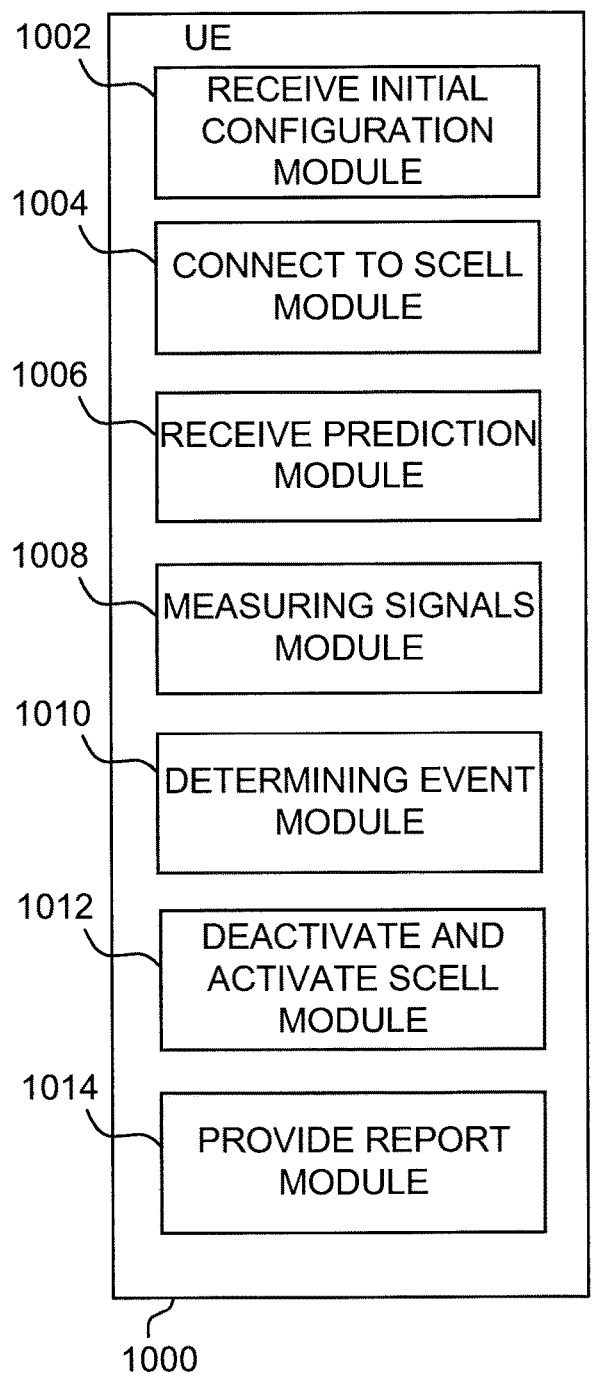

FIG. 10 illustrates schematically a UE that comprises:
- a receive module 1002 configured to receive, from a network node, initial configuration data that comprises information regarding at least one secondary cell, SCell, one of which is a current SCell to which the UE is to be connected, and at least one event triggering condition that defines radio signal measurement conditions for use by the UE when switching connection between a current SCell and a subsequent SCell,
- a connect module 1004 configured to connect to the current SCell, and repeating the steps of:
- a receive module 1006 configured to receive, from the network node, information that specifies at least one predicted subsequent SCell,
- a measure module 1008 configured to measure radio signals associated with the current SCell and radio signals associated with said at least one SCell,
- a determining module 1010 configured to determine, based on the measuring of radio signals, an event according to the at least one event triggering condition and, if said event indicates that a specific SCell among the at least one predicted subsequent SCell is better than the current SCell:
- a deactivate module 1012 configured to deactivate the current SCell and activating the specific SCell that is better than the current SCell whereby the specific SCell becomes the current SCell, and
- a provide module 1014 configured to provide, to the network node, a report that comprises information regarding the determined event and information regarding the activation of the specific SCell that is better than the current SCell.

The UE 1000 may comprise further modules that are configured to perform in a similar manner as, e.g., the UE 800 described above in connection with FIG. 8.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by a network node in a wireless communication system, said wireless communication system providing carrier aggregation (CA) for a user equipment (UE), said UE being located in and connected to a primary cell (PCell), the method comprising:
   transmitting, to the UE, initial configuration data that comprises information regarding at least one secondary cell (SCell), one of which is a current SCell to which the UE is to be connected, and at least one event triggering condition that defines radio signal measurement conditions for use by the UE when switching connection between a current SCell and a subsequent SCell, and repeating the steps of:

obtaining monitoring data associated with the UE, said monitoring data comprising spatial information regarding movement of the UE in relation to the at least one SCell, calculating, based on the monitoring data, at least one prediction of at least one subsequent predicted SCell into which the UE is expected to enter at a future time, transmitting, to the UE, information that specifies said at least one predicted subsequent SCell, providing, to the at least one subsequent predicted SCell, preparation information that comprises information for the at least one subsequent predicted SCell that it is to operate as a SCell in relation to the UE.

2. The method of claim 1, comprising:
determining whether or not the UE has switched from being connected to the current SCell to being connected to one specific SCell among the at least one subsequent predicted SCell, and, if so:
updating the monitoring data with information that comprises spatial movement of the UE into the specific SCell, whereby the specific SCell becomes the current SCell.

3. The method of claim 1, wherein the at least one event triggering condition is configured for triggering any event of:
event X1 being triggered by the UE based on an outcome of a comparison of signal measurements performed on the current SCell and the at least one predicted subsequent SCell by the UE,
event X2 being triggered by the UE based on an outcome of a comparison of a signal measurement performed by the UE by comparing the at least one predicted subsequent SCell with a threshold, and
event X3 being triggered based on an outcome of a comparison of a signal measurement performed by the UE on the current SCell with a threshold.

4. The method of claim 1, wherein the obtaining of monitoring data comprises receiving mobility attributes associated with the UE, and wherein:
the calculation of at least one prediction of at least one subsequent predicted SCell into which the UE is expected to enter at the future time comprises using the received mobility attributes.

5. The method of claim 1, wherein the obtaining of monitoring data comprises determining mobility attributes associated with the UE, and wherein:
the transmission of information that specifies said at least one predicted subsequent SCell comprises transmission of said mobility attributes, and
the calculation of at least one prediction of at least one subsequent predicted SCell into which the UE is expected to enter at the future time comprises using the received mobility attributes.

6. The method of claim 1, comprising:
receiving, from the UE, information regarding the UE capability of being preconfigured with one or more SCells for use as one or more SCell at a future time, and wherein the initial configuration data comprises at least part of said information regarding the UE capability.

7. The method of claim 1, comprising determining that a handover to a subsequent PCell is in progress, and in response to this determination, providing information regarding to the subsequent PCell, said information comprising any of UE movement and mobility attributes associated with the UE.

8. A method, performed by a user equipment (UE), said UE being located in and connected to a primary cell (PCell) in a wireless communication system, said wireless communication system providing carrier aggregation (CA), the method comprising:
receiving, from a network node, initial configuration data that comprises information regarding at least one secondary cell (SCell), one of which is a current SCell to which the UE is to be connected, and at least one event triggering condition that defines radio signal measurement conditions for use by the UE when switching connection between a current SCell and a subsequent SCell,
connecting to the current SCell, and repeating the steps of:
receiving, from the network node, information that specifies at least one predicted subsequent SCell that the user equipment is expected to enter at a future time, measuring radio signals associated with the current SCell and radio signals associated with said at least one SCell,
determining, based on the measuring of radio signals, an event according to the at least one event triggering condition and, if said event indicates that a specific SCell among the at least one predicted subsequent SCell is better than the current SCell:
deactivating the current SCell and activating the specific SCell that is better than the current SCell whereby the specific SCell becomes the current SCell, and
providing, to the network node, a report that comprises information regarding the determined event and information regarding the activation of the specific SCell that is better than the current SCell.

9. The method of claim 8, wherein the at least one event triggering condition is configured for triggering any event of:
event X1 being triggered by the UE based on an outcome of a comparison of signal measurements performed on the current SCell and the at least one predicted subsequent Scell by the UE,
event X2 being triggered by the UE based on an outcome of a comparison of a signal measurement performed by the UE by comparing the at least one predicted subsequent SCell with a threshold, and
event X3 being triggered based on an outcome of a comparison of a signal measurement performed by the UE on the current SCell with a threshold.

10. The method of claim 8, comprising:
determining, if no event is determined that indicates that a specific SCell among the at least one predicted subsequent SCell is better than the current SCell, an event that indicates whether or not a specific SCell that is not among the at least one predicted SCell is better than the current SCell, and if said event indicates that a specific SCell that is not among the at least one predicted SCell is better than the current SCell:
providing, to the network node, a report that comprises information regarding the determined event and information regarding the activation of the specific SCell that is not among the at least one predicted SCell and that is better than the current SCell.

11. The method of claim 10, comprising:
obtaining mobility attributes associated with the UE, and wherein the provision of a report to the network node comprises providing said mobility attributes.

12. The method of claim 11, further comprising:
calculating, based on the monitoring data, at least one prediction of at least one subsequent predicted SCell into which the UE is expected to enter at the future time, and wherein the provision of a report to the network node comprises providing said prediction of at least one subsequent predicted SCell.

13. The method of claim 8, comprising:
transmitting, to the network node, information regarding the UE capability of being preconfigured with one or more SCells for use as one or more SCell at a future time.

14. A network node comprising input/output circuitry, a processor and a memory, said memory containing instructions executable by said processor whereby said node is operative to:
transmit, to a user equipment (UE), initial configuration data that comprises information regarding at least one secondary cell (SCell), one of which is a current SCell to which the UE is to be connected, and at least one event triggering condition that defines radio signal measurement conditions for use by the UE when switching connection between a current SCell and a subsequent SCell, and repeating the steps of:
obtain monitoring data associated with the UE, said monitoring data comprising spatial information regarding movement of the UE in relation to the at least one SCell,
calculate, based on the monitoring data, at least one prediction of at least one subsequent predicted SCell into which the UE is expected to enter at a future time,
transmit, to the UE, information that specifies said at least one predicted subsequent SCell,
provide, to the at least one subsequent predicted SCell, preparation information that comprises information for the at least one subsequent predicted SCell that it is to operate as a SCell in relation to the UE.

15. A user equipment comprising radio frequency circuitry, a processor and a memory, said memory containing instructions executable by said processor whereby said node is operative to:
receive, from a network node, initial configuration data that comprises information regarding at least one secondary cell (SCell), one of which is a current SCell to which the UE is to be connected, and at least one event triggering condition that defines radio signal measurement conditions for use by the UE when switching connection between a current SCell and a subsequent SCell,
connect to the current SCell, and repeating the steps of:
receive, from the network node, information that specifies at least one predicted subsequent SCell that the user equipment is expected to enter at a future time,
measure radio signals associated with the current SCell and radio signals associated with said at least one SCell,
determine, based on the measuring of radio signals, an event according to the at least one event triggering condition and, if said event indicates that a specific SCell among the at least one predicted subsequent SCell is better than the current SCell:
deactivate the current SCell and activating the specific SCell that is better than the current SCell whereby the specific SCell becomes the current SCell, and
provide, to the network node, a report that comprises information regarding the determined event and information regarding the activation of the specific SCell that is better than the current SCell.

16. A nontransitory computer readable storage medium comprising a computer program comprising instructions which, when executed on at least one processor in a network node in a wireless communication system, said wireless communication system providing carrier aggregation (CA) for a user equipment (UE), said UE being located in and connected to a primary cell, cause the network node to carry out a method comprising:
transmitting, to the UE, initial configuration data that comprises information regarding at least one secondary cell (SCell), one of which is a current SCell to which the UE is to be connected, and at least one event triggering condition that defines radio signal measurement conditions for use by the UE when switching connection between a current SCell and a subsequent SCell, and repeating the steps of:
obtaining monitoring data associated with the UE, said monitoring data comprising spatial information regarding movement of the UE in relation to the at least one SCell,
calculating, based on the monitoring data, at least one prediction of at least one subsequent predicted SCell into which the UE is expected to enter at a future time,
transmitting, to the UE, information that specifies said at least one predicted subsequent SCell,
providing, to the at least one subsequent predicted SCell, preparation information that comprises information for the at least one subsequent predicted SCell that it is to operate as a SCell in relation to the UE.

17. A nontransitory computer readable storage medium comprising a computer program comprising instructions which, when executed on at least one processor in a user equipment (UE), said UE being located in and connected to a primary cell (PCell) in a wireless communication system, said wireless communication system providing carrier aggregation (CA), cause the UE to carry out a method comprising:
receiving, from a network node, initial configuration data that comprises information regarding at least one secondary cell (SCell), one of which is a current SCell to which the UE is to be connected, and at least one event triggering condition that defines radio signal measurement conditions for use by the UE when switching connection between a current SCell and a subsequent SCell,
connecting to the current SCell, and repeating the steps of:
receiving, from the network node, information that specifies at least one predicted subsequent SCell that the UE is expected to enter at a future time,
measuring radio signals associated with the current SCell and radio signals associated with said at least one SCell,
determining, based on the measuring of radio signals, an event according to the at least one event triggering condition and, if said event indicates that a specific SCell among the at least one predicted subsequent SCell is better than the current SCell:
deactivating the current SCell and activating the specific SCell that is better than the current SCell whereby the specific SCell becomes the current SCell, and
providing, to the network node, a report that comprises information regarding the determined event and information regarding the activation of the specific SCell that is better than the current SCell.

* * * * *